July 6, 1965   H. BECKER   3,193,266
ROTARY FURNACE

Filed May 8, 1962   2 Sheets-Sheet 1

Helmut Becker
INVENTOR.

BY Karl F. Ross
AGENT.

United States Patent Office 3,193,266
Patented July 6, 1965

3,193,266
ROTARY FURNACE
Helmut Becker, Oberhausen-Osterfeld, Germany, assignor to Hüttenwerk Oberhausen A.G., Oberhausen, Germany, a company of Germany
Filed May 8, 1962, Ser. No. 193,164
Claims priority, application Germany, May 9, 1961, H 42,540
5 Claims. (Cl. 263—32)

My present invention relates to a rotary furnace of the type used, for example, in the sintering of ores such as magnesite and dolomite, the burning of limestone or the roasting of cementitious materials such as gypsum. Such rotary furnaces may also be used, as more fully disclosed in commonly assigned application Ser. No. 130,664 filed August 10, 1961 by Walter Dick and Ludwig von Bogdandy, as a final stage in the reduction of metallic oxides, particularly iron oxides.

The maintenance of a dependable seal between the rotary furnace and its stationary headers is of great importance. If the connection is not tight, then excess air may intrude into its interior to interfere with the reactions, lower the thermal efficiency by dissipating part of the available heat, and/or adulterate the waste gases which in known manner may be supplied to an analyzer for controlling the processes. At the same time the furnace gases as well as floating particles may escape into the surrounding atmosphere, thereby further lowering the efficiency and impairing the health of the operating personnel.

It is, therefore, the general object of my invention to provide means for securely sealing the joint between a rotary furnace and an adjoining header therefor.

In a system for the reduction of iron ores, as described in the above-identified Dick et al. application, considerable pressure differences may exist between the interior of the furnace and the outer atmosphere. Under these circumstances the absence of a tight joint between the rotary furnace and its headers is particularly objectionable since even a small leakage path will result in the loss of sizable amounts of valuable reduction gases and since the mingling of these gases with the surrounding air may give rise to violent reactions. Thus, a more specific object of this invention is the provision of means for establishing a gas-tight connection in an installation of the type disclosed in the commonly assigned application.

The difficulty of maintaining the desired fluid-tight seal between the rotary furnace and its headers is traceable in part to the fact that these parts cannot readily be machined to precisely coaxial configurations whereby a variable clearance unavoidably exists between the furnace inlet or outlet and an annular neck or collar extending into or around it at the joint. Thus, it is also an object of my invention to provide a seal compensating for such departures from precise concentricity in a pair of relatively rotatable generally tubular members forming ducts for the passage of a fluid therebetween.

In accordance with this invention I provide, as a seal between two annular members such as a stationary header and a rotary furnace adjoining same, a tubular (i.e. generally cylindrical or conical) bellows fastened to one of these members at one extremity while having another extremity slidably contacting an annular shoulder, substantially transverse to the axis of rotation, on the other member. The bellows may be urged into contact with this shoulder by its own inherent resiliency and/or by supplemental spring means.

Suitable heat-resistant materials for the bellows include, particularly, refractory steel. A ring of low-friction bearing material, e.g. copper asbestos, graphite asbestos, copper bronze and similar metals, alloys and metalized fibers, may be used according to existing requirements of sealing ability and thermal resistance.

The invention will be described in greater detail with reference to the accompanying drawing in which.

Figure 1:
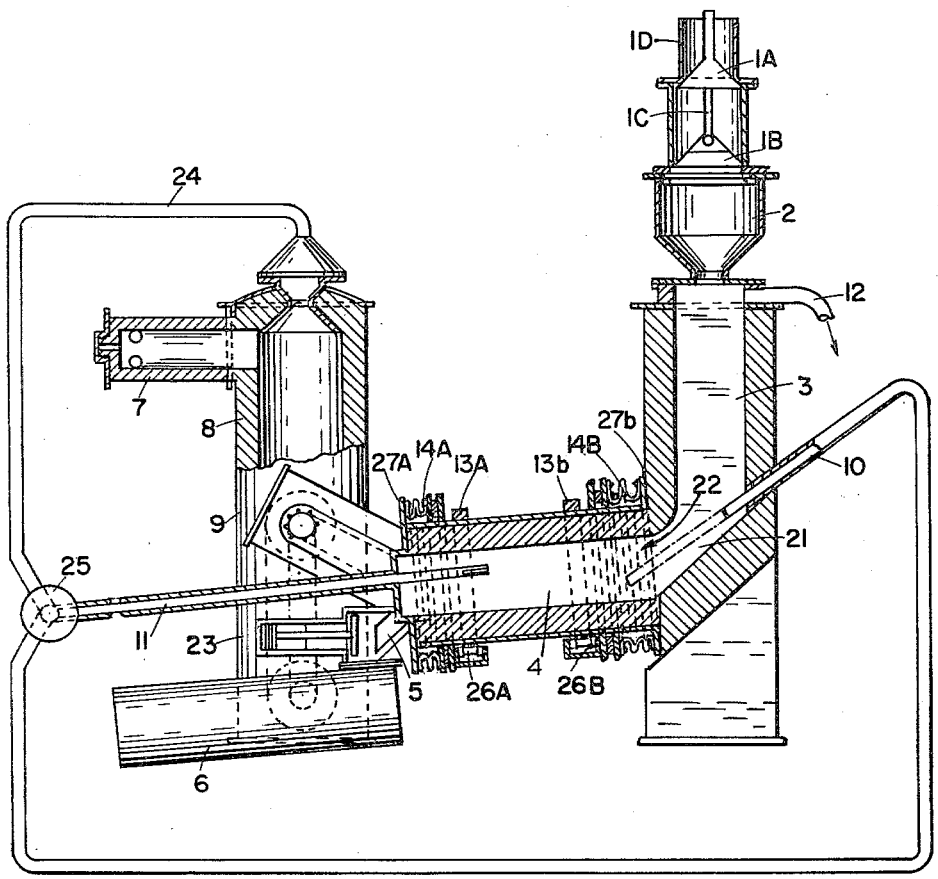
FIG. 1 is a cross-sectional view of a two-stage reduction furnace of the type shown in the aforementioned Dick et al. application, provided with two seals according to my invention.

As shown in FIG. 1, an ore charge is introduced through two cascaded bell-shaped shutters 1A, 1B adapted to be opened (e.g. manually) with the aid of telescoped stems 1C, 1D. The charge then passes through a hopper 2 and enters a pre-reduction chamber 3 where it is preheated by the rising reduction gases and preliminary reduction takes place. A slanting bottom 21 of the chamber 3 supports most of the weight of the charge and diverts its flow toward a rotating drum 4 directly connected to a side opening 22 of chamber 3. The drum 4 serves as a final-reduction chamber from which the reduced mass slides over a chute 5 into a cooling vessel 6 whence the metal can be recovered; chute 5 can be selectively opened and closed by a hydraulically operated plunger 23. The necessary reduction gases are prepared and pre-heated in a cyclone-type combustion chamber 7, in which a first-stage gas reaction takes place, and a chamber 8 for a secondary gas reaction, both serving to produce a gas of the desired temperature and composition. The reduction gas flows into the final-reduction chamber 4 via a conduit 24, a valve 25 and a tube 11; an auxiliary inlet tube 10 is adjustably positioned near the bottom of pre-combustion chamber 3 for admitting additional reduction gas, if needed, at the junction of the two chambers. The drum 4 has external rings 13A, 13B resting on several sets of rollers 26A, 26B (only one set being shown) and is provided at its ends with bellow-type seals 14A, 14B attached to stationary end flanges 27A, 27B. An exhaust pipe 12 at the top of chamber 3 serves for the discharge of the spent reduction gases.

Figure 2:
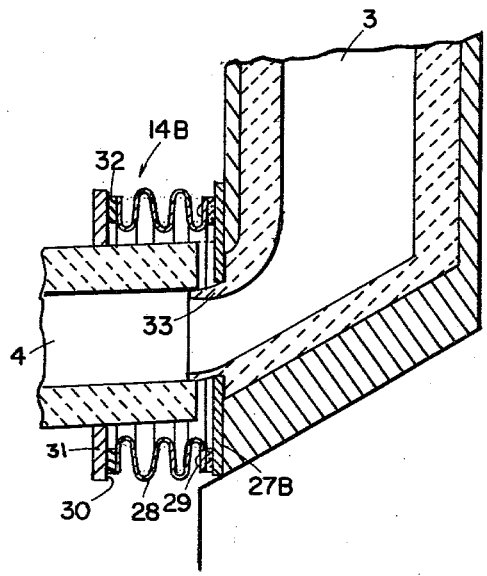
FIG. 2 shows in greater detail and on a larger scale the seal provided at the entrance end of the rotary drum forming the final-reduction chamber of the furnace of FIG. 1.

As shown more clearly in FIG. 2, the seal 14B between the rotary furnace drum 4 and the flange 27B constituting the entrance header therefor comprises a flexible tubular bellows 28, e.g. of heat-resistant steel, which is fastened at one end to flange 27B by means of bolts 29 and has a free opposite extremity slidably bearing upon an annular shoulder 30 which is formed by a collar 31 welded to the exterior of drum 4. A bearing ring 32, of one of the antifriction materials specified above, is interposed between bellows 28 and shoulder 30 while being fastened to collar 31. The stationary furnace part constituting the pre-reduction chamber 3 is formed with a neck 33 which extends generally coaxially but with some clearance, necessitated by departures from precise circular shape, into the entrance end of drum 4. Contact between bellows 28 and ring 32 is maintained by the inherent resiliency of the bellows.

Figure 3:
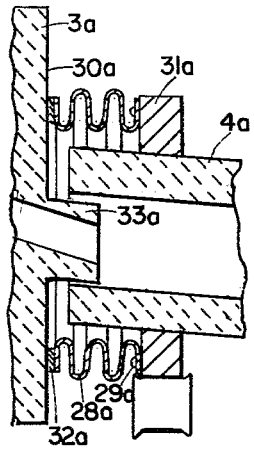
FIGS. 3–5 are views generally similar to FIG. 2, illustrating modified forms of seal.

FIG. 3 shows a similar arrangement wherein, however, the furnace part 4a is provided with a collar 31a having the bellows 28a bolted to it at 29a. The other extremity of the bellows, rotating with the drum 4a, abuts a bearing ring 32a which is fixed to the shoulder defined by the stationary header 3a. The latter, provided with a neck 33a projecting into the drum inlet, may again be part of a furnace part constituting a chamber for the preliminary treatment of the charge.

Figure 4:
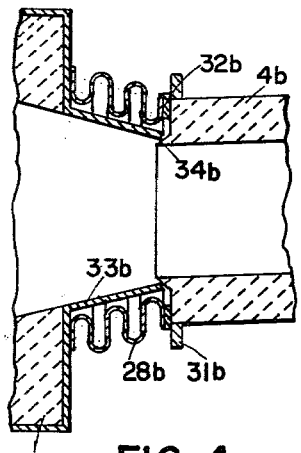

FIG. 4 illustrates a joint generally similar to that of FIG. 2, except that the bellows 28b bolted to a stationary header 3b is of frustoconical rather than cylindrical shape while concentrically surrounding a similarly frustoconical collar 33b surrounding with clearance a projecting neck 34b of drum 4b. The free end of bellows 28b engages, as in FIG. 2, a bearing ring 32b interposed between it and a shoulder formed in part by an outer collar 31b; bearing ring 32b may be rigid with either the bellows or the drum, preferably the latter. The joint shown in this figure might be used at the outlet rather than the inlet of the drum, thus at the location represented by seal 14A in FIG. 1.

Figure 5:
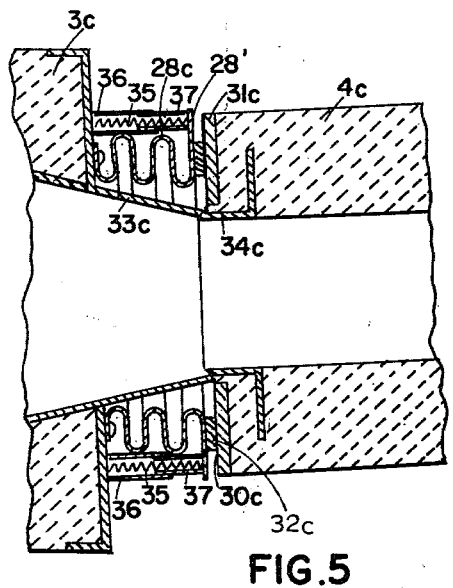

The seal shown in FIG. 5 is similar to that of FIG. 4, comprising a bellows 28c which is fastened to a header 3c and free to slide relatively to a bearing ring 32c on a shoulder 30c of an annular shield plate 31c rigid with drum 4c. A collar 33c extending from header 3c again surrounds a neck 34c of the drum here shown as formed by a separate insert imbedded therein. A series of compression springs 35, disposed in a circular array around bellows 28c, act upon the free extremity 28′ thereof to urge it into firmer contact with ring 32c; each of these springs is housed in a pair of telescoping tubes 36, 37 respectively secured to header 3c and to bellows extremity 28′.

The sliding surface between the bellows and the adjoining antifriction ring may be lubricated by any convenient means not further illustrated.

Modifications of the specific structures described and illustrated, including substitutions and combinations of compatible features from different embodiments, will be readily apparent to persons skilled in the art and are intended to be embraced in the spirit and scope of the invention as defined in the appended claims.

I claim:

1. A seal for a pair of relatively rotatable tubular members forming ducts for the passage of a fluid therebetween, comprising a tubular bellows secured at one end to one of said members while surrounding an adjacent part of the other of said members, means on said other of said members forming a planar first surface substantially transverse to the axis of rotation, said bellows having a free extremity with a second substantially transverse planar surface resiliently urged toward said first surface, and a solid ring of rigid low-friction material interposed between said surfaces and secured to one of them for enabling relative rotation of said surfaces.

2. The combination according to claim 1 wherein said material consists of metalized asbestos fibers.

3. The combination according to claim 1 wherein said material consists of graphitized asbestos fibers.

4. The combination according to claim 1 wherein said material includes copper.

5. A seal for a pair of relatively rotatable tubular members forming ducts for the passage of a fluid therebetween, comprising a tubular bellows secured at one end to one of said members while surrounding an adjacent part of the other of said members, means on said other of said members forming a planar first surface substantially transverse to the axis of rotation, said bellows having a free extremity with a second substantially transverse planar surface resiliently urged toward said first surface and a solid ring of rigid low-friction material interposed between said surfaces and secured to said first surface for enabling relative rotation of said surfaces, said extremity embracing said other of said members with sufficient all-around clearance to enable radial displacement of said extremity along said ring.

References Cited by the Examiner

UNITED STATES PATENTS

| | | | |
|---|---|---|---|
| 1,606,124 | 11/26 | Hornsey | 263—32 |
| 1,685,972 | 10/28 | Amme et al. | 263—32 |
| 2,472,497 | 6/49 | Stookey | 263—42 |
| 2,849,220 | 8/58 | Duffy et al. | 263—42 |
| 3,068,016 | 12/62 | Dega | 277—96 |
| 3,093,382 | 6/63 | Macks | 277—96 X |
| 3,117,794 | 1/64 | Wachal | 277—96 X |
| 3,122,375 | 2/64 | Greenwald | 277—96 X |

FOREIGN PATENTS

| | | |
|---|---|---|
| 650,259 | | France. |
| 494,793 | 3/30 | Germany. |
| 473,709 | 10/37 | Great Britain. |

CHARLES SUKALO, *Primary Examiner.*

JOHN J. CAMBY, PERCY L. PATRICK, *Examiners.*